Dec. 15, 1970 J. D. MACDOUGALL ET AL 3,548,269

RESISTIVE LAYER SEMICONDUCTIVE DEVICE

Filed Dec. 3, 1968

3,548,269

RESISTIVE LAYER SEMICONDUCTIVE DEVICE

John D. MacDougall and Kenneth E. Manchester, Williamstown, Mass., assignors to Sprague Electric Company, North Adams, Mass., a corporation of Massachusetts Filed Dec. 3, 1968, Ser. No. 780,812
Int. Cl. H01l 3/22
U.S. Cl. 317—234 9 Claims

ABSTRACT OF THE DISCLOSURE

A resistive layer having precise sheet resistivity and temperature coefficient of resistance is provided within a semi-conductive body by impurities of both conductivity type being disposed within said body in coextensive distribution and substantially constant ratio of concentration throughout at least a major portion of said layer, and with one of said impurities having slightly greater concentration than that of the other for providing a junction between said layer and said body.

In the method, ions of opposite impurity type are injected by ion implantation to substantially equal depth to provide substantially similar and coextensive impurity distributions within the body, and a larger dose of one impurity is provided to create a junction between the layer and the body.

BACKGROUND OF THE INVENTION

This invention relates to a resistive semiconductive device and more particularly to a semiconductive device having a layer of high sheet resistivity and controlled temperature coefficient of resistivity, and to a method of providing the same.

The present day sophistication of semiconductor devices and microcircuits and the demands placed upon them, make it extremely desirable to be able to produce a high sheet resistivity layer with a selected temperature coefficient of resistivity (TCR) for use as resistors and the like. In many applications, TCR requirements are in the range of 100–500 parts per million (p.p.m.) change in resistive value per degree C. while resistor values may be as high as megohms. In addition, a controlled variation of resistance with temperature is often highly desirable to compensate for the variation with temperature of other circuit components.

Those expert in the diffusion technology teach useable sheet resistance in the range of 50–300 ohms per square with TCR's in the range of 1000–2500 p.p.m. change in resistive value per degree C. However, these properties can not satisfy many of the present circuit requirements, thus, hybrid type structures having deposited thin film elements which are fabricated apart from the semiconductor body are presently employed.

Hybrid circuits are more difficult to produce and generally involve operations which are not compatible to the heterogeneous nature of the system. Another disadvantage to the hybrid approach for fabricating certain low power circuits is the amount of area necessary to fabricate large value resistors of the metal film type which inherently have low sheet resistance. Furthermore, those skilled in the design or operation of semiconductor devices will recognize the importance of a semiconductive layer having controlled sheet resistivity and TCR for use in devices other than resistors, such as for example, in field effect transistors and the like.

It is an object of this invention to provide a semiconductive device having a resistive layer of selected temperature coefficient of resistivity.

It is another object of this invention to provide a semiconductive device having a resistive layer of high sheet resistivity and controlled temperature coefficient of resistivity.

It is a further object of this invention to provide a method of producing a semiconductive device in which a resistive layer having selected temperature coefficient of resistivity is provided within a semiconductive body.

It is a still further object of this invention to provide a method for producing a layer of high sheet resistivity and selected temperature coefficient of resistivity within a semiconductive body.

SUMMARY OF THE INVENTION

A semiconductive device provided in accordance with the invention comprises a body of semiconductive material of one conductivity type, a layer of high sheet resistivity disposed within said body, said layer having impurities of both conductivity type, said impurities having substantially smilar distribution throughout said layer, and one of said impurities having a concentration slightly larger than the other so as to provide a junction beween said layer and said body.

A method of producing a semiconductive device in accordance with the invention comprises the steps of injecting impurity ions of one conductivity type over a particular area and to a selected depth within a semiconductive body, and injecting a slightly greater amount of impurity ions of the other conductivity type over substantially the same area and to substantially the same depth within said body to provide substantially equal and coextensive distributions of the impurities and a junction beween said impurity distribution and said body.

DESCRIPTION OF THE PREFERRED EMBODIMENTS

Figure 1:
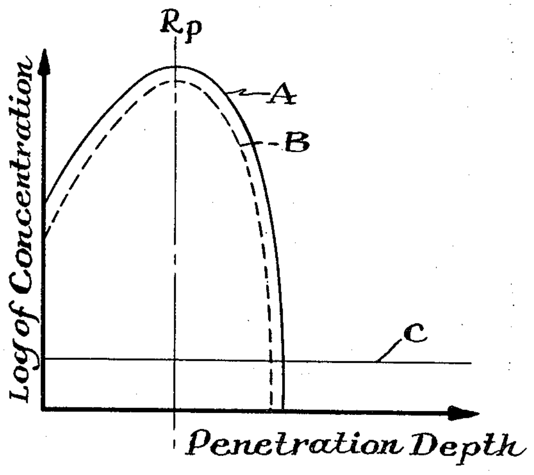
FIG. 1 is a graph showing impurity distribution provided in accordance with the method of the invention.

FIG. 1, curve A, shows a typical concentration distribution of implanted ions in a body of semiconductive material, such as silicon or the like, which has a bulk dopant concentration as depicted at C. The projected range, $R_p$, of the implanted ions is characteristic of the energy of the implanted ion, its mass, and the atomic mass of the body which is bombarded. The concentration level and the shape of the distribution are characterized by the projected range and the total number of ions.

The distribution shown in FIG. 1 is produced in an apparatus (not shown) in which ions are extracted in a vacuum from an ion source, accelerated, and focused in a lens system. The ion beam is directed through a mass analyzer by deflection plates or the like. Adjustment of the analyzer allows only the desired ion to pass through it to bombard the semiconductive target body. A detector determines the ion beam current, and the time of exposure determines the number of ions impinged on the semiconductive target.

In this novel method, two species of ion, one of which produces p-type conductivity and the other of which produces n-type conductivity, are injected in the same area of the body and in almost equal amounts to substantially the same depth such that the projected range, $R_p$, of each are substantially identical and the ratio of concentrations at any depth within the active distribution is nearly constant. Then the structure is annealed to constant carrier concentration, for example by heating to above 800° C.

For example, if the semiconductive body is n-type silicon, curve A may represent an implanted boron distribution while curve B is an implanted phosphorus concentration. Changing the total number of implanted ions and their concentration ratio $C_B/C_A$ (where $C_A$ is always the larger concentration) controls the sheet resistivity and TCR of the implanted layer.

Figure 2:
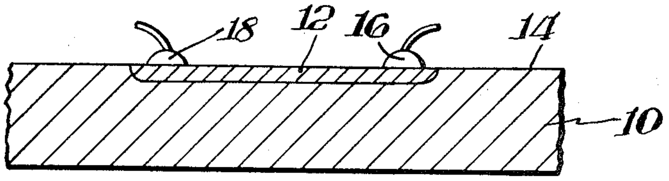
FIG. 2 is a view in section of a resistor provided in accordance with the invention.

FIG. 2 is an illustration of a resistor produced in accordance with the invention. Herein body 10 is a body of semiconductive material such as n-type silicon or the like. Region 12 is provided by ion implantation in the upper surface 14 of the body and contacts 16 and 18 are connected to either end of layer 12 by any conventional means.

Both n- and p-type ions are implanted in layer 12 to equal depth, as indicated in the described method, to provide the impurity distribution of curves A and B while the concentration level of body 10 is that represented at C of FIG. 1. In this case, a slightly greater dose of the p-type species is provided so that a slightly greater concentration of the p-type impurity results, and provides, in turn, a p-n junction between region 12 and body 10.

Figure 3:
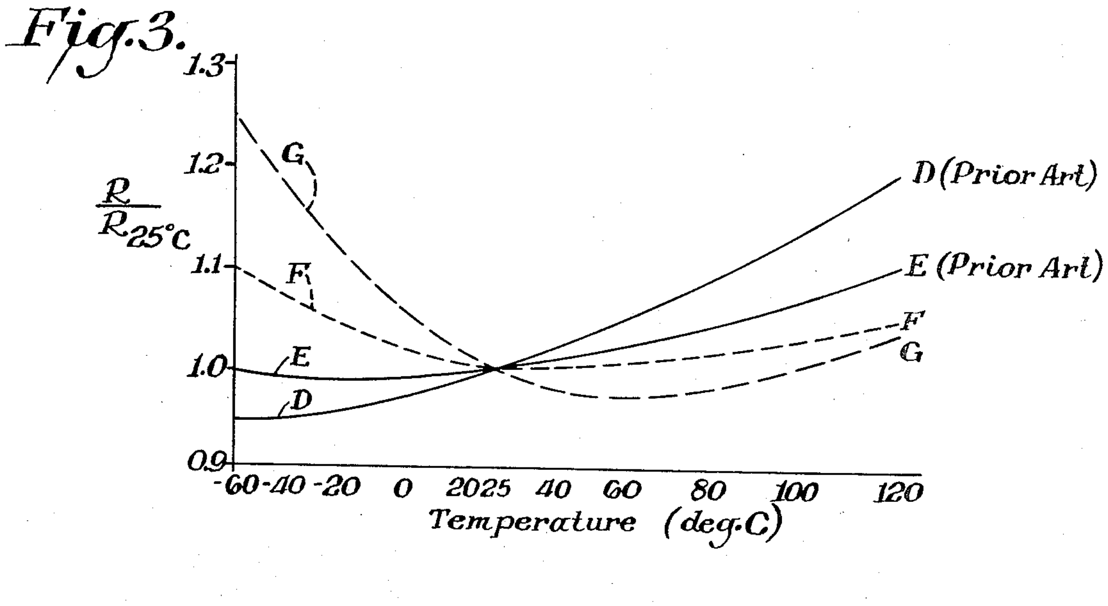
FIG. 3 is a graph illustrating the temperature dependance of resistive layers in comparison to those of the prior art.

In a specific example, a body of n-type silicon was implanted with n- and p-type ions in the described manner to provide a particular sheet resistivity and temperature coefficient of resistivity. For comparison, conventional diffused and implanted resistive layers were also constructed, and their variation in sheet resistivity with temperature is shown in FIG. 3 along with data of examples produced in accordance with the invention. The surface geometry of both the implanted and diffused structures were defined in each case by etching openings in an overlying silicon dioxide passivating layer by conventional photolithographic techniques in accordance with conventional methods known to the semiconductor industry.

In FIG. 3, the change in resistance with respect to the resistance at 25° C. is plotted against temperature. Herein curve D represents the resistive variation of a typical base and resistor diffused layer while curve E represents a conventional implantation layer. Finally, curves F and G represent the dual ion layer provided in accordance with the invention.

Samples E, F and G were prepared by bombarding single crystal n-type silicon having (111) orientation and bulk resistivity of 1Ω-cm., with boron and phosphorus ions accelerated to energies of 40 k.e.v. and 110 k.e.v., respectively. Samples E and F received an integrated dose of $7.7\times10^{13}$ $^{11}B^{+}$ ions/cm.$^2$ while sample G received $3.4\times10^{13}$ $^{11}B^{+}$ ions/cm.$^2$. Sample E received no phosphorus ions, whereas sample F received $7.4\times10^{13}$ $^{31}p^{++}$ ions and sample G received $3.0\times10^{13}$ $^{31}p^{++}$ ions. Sample E, F and G each were annealed at 950° C. for 20 minutes in dry nitrogen after ionic exposure, and all samples were then contacted and their electrical properties determined by conventional means.

The sheet resistivity of the diffused layer D was .14 kΩ/square while that of the sample E was .8 kΩ/square. The sheet resistivity of the dual ion implanted regions were 1.6 kiloohm/square and 4.8 kiloohm/square at 25° C. for samples F and G respectively.

The improved TCR obtained by the present method is most evident from a comparison of the behavior of samples F and G with that of the diffused layer sample D in the temperature range 0° C. to 125° C. In addition, a comparison of prior art samples D and E with F and G in the temperature range from 0° C. to 50° C. clearly shows an opposite variation of resistance with temperature. Thus, the fabrication of a parallel structure consisting of two or more of the conducting layers can lead to a still further reduction in TCR over a restricted temperature range.

Figure 4:
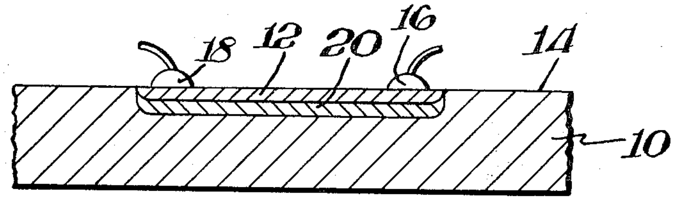
FIG. 4 is a view in section of a further embodiment of the invention.

Parallel layers may be provided in either a lateral, that is a side by side arrangement or in an overlying arrangement, however, the latter is preferred since only a single masking step is required. A preferred embodiment of a parallel layer unit is illustrated in FIG. 4 wherein layer 12 having dual impurities is provided overlying a layer 20. In this case layer 20 may be a diffused layer on an ionic implantation of one impurity, that is layer 20 may be provided by either of the examples represented by curves D and E in FIG. 3. Then by controlling layer 12 to provide a particular TCR of opposite sign to that of layer 20, the structure will provide a more precise temperature coefficient of resistivity than could be provided by either of the regions separately.

In the given examples, the concentration of boron, that is acceptor or p-type ions, is made slightly greater than that of the n-type phosphorus ions such that the layer region 12 has a slight predominance of p-type which in turn forms a p-type junction between the resistive layer and the body. Thus in sample F, the boron surface concentration is $7.7\times10^{13}$/cm.$^2$ as compared to a phosphorus concentration of $7.4\times10^{13}$/cm.$^2$ and in sample G the boron concentration is $3.4\times10^{13}$/cm.$^2$ as compared to a phosphorus concentration of $3.0\times10^{13}$/cm.$^2$ to provide concentration ratios of .96 and .88 respectively. Practical concentration ratios may range from 0.1 to 0.99.

In the example, the implanted ion of opposite conductivity type to that of the body is made slightly predominant, however, the implanted ion of similar impurity type to the body could be of largest concentration so as to provide a high-low rather than a p-n junction. Moreover, although the impurities of the examples were separately implanted both may be simultaneously implanted.

Many different embodiments are possible of course, and it should be realized that the described resistive layer may be utilized in many different structures, such as for resistors, integrated interconnection between elements of an integrated slice, or as regions of other semiconductive devices such as field effect transistors and the like. It should also be recognized that although in the specific example, silicon material was employed the method is also applicable to other semiconductive materials such as for example germanium and iintermetallics of the III–V and II–VI types and the like.

What is claimed is:

1. A semiconductive device comprising a body of one conductivity type, a layer of high sheet resistivity disposed within said body, said layer having ion implanted impurities of both conductivity types with said impurities having a substantially similar distribution of concentration with respect to depth throughout said layer, one of said impurities having at least slightly greater concentration than the concentration of the other impurity, and said one impurity having a concentration greater than the concentration level of said body, and the ratio of concentration of said impurities being substantially constant throughout at least the major portion of said layer.

2. The device of claim 1 wherein said impurity of greatest concentration is of opposite conductivity type to that of said body so as to provide a p-n junction between said layer and said body.

3. The device of claim 1 wherein said impurity of greatest concentration is of the same conductivity type as that of said body.

4. The device of claim 1 wherein said ratio of concentration of said impurities is within the range of 0.1 to 0.99 throughout the major portion of said layer.

5. The device of claim 1 including another resistive region substantially parallel to the first ressitive region, and said second region having a different temperature coefficient of resistivity than that of said first layer thereby providing a combined temperature coefficient of resistivity from the combination of both layers.

6. A method of producing a semiconductive layer of specific resistivity and temperature coefficient of resistivity within a semiconductive body containing impurities producing a conductivity type material comprising the steps of: ion beam implanting impurity ions of a first conductivity type over a particular area and to a selected depth within said body; and ion beam implanting at least a slightly greater amount of an impurity ion of a second conductivity type over substantially the same area and to substantially the same depth, said second ion being implanted in a concentration level greater than the concentration level of said conductivity impurity in said body, said first and second ions being implanted in substantially coextensive distributions within said body and in a substantially constant ratio of concentrations over the major portion of their distribution.

7. The method of claim 6 wherein both said impurities are simultaneously implanted.

8. The method of claim 6 wherein impurity ions of opposite conductivity to that of said body are implanted in said greater amount to provide a P-N junction between said coextensive distributions and said body.

9. The method of claim 8 wherein said body is n-type silicon and the ratio of concentrations of implanted n-type impurity ion to implanted p-type impurity ion is less than 1 throughout the distribution.

References Cited

UNITED STATES PATENTS

| | | | |
|---|---|---|---|
| 2,570,978 | 10/1951 | Pfann | 317—235 |
| 2,586,080 | 2/1952 | Pfann | 317—235 |
| 2,666,814 | 1/1954 | Shockley | 317—235 |
| 2,672,528 | 3/1954 | Shockley | 317—235 |
| 2,878,152 | 3/1959 | Runyan et al. | 317—235 X |
| 3,343,114 | 9/1967 | Rice | 317—235 X |
| 3,443,167 | 5/1969 | Willardson | 317—234 |

JAMES D. KALLOW, Primary Examiner

U.S. Cl. X.R.

29—576